United States Patent [19]

Broding

[11] 3,916,371
[45] Oct. 28, 1975

[54] REMOTE SEISMOMETER CONTROLLER

[75] Inventor: Robert A. Broding, Tulsa, Okla.

[73] Assignee: Amoco Production Company, Tulsa, Okla.

[22] Filed: Aug. 31, 1973

[21] Appl. No.: 393,694

[52] U.S. Cl.... 340/15.5 TS; 340/167 R; 340/15.5 MC
[51] Int. Cl.$^2$.......................................... G01V 1/16
[58] Field of Search......... 340/15.5 TS, 15.5 GC, 340/15.5 MC, 150, 152 R, 167 R

[56] References Cited
UNITED STATES PATENTS

| | | | |
|---|---|---|---|
| 3,283,295 | 11/1966 | Montgomery | 340/15.5 TS |
| 3,541,257 | 11/1970 | McCormick et al. | 178/22 |
| 3,652,979 | 3/1972 | Angelle | 340/15.5 TS |
| 3,748,638 | 7/1973 | Montgomery, Jr. et al. | 340/15.5 TS |
| 3,775,738 | 11/1973 | Quay | 340/15.5 MC |
| 3,806,864 | 4/1974 | Broding et al. | 340/15.5 DP |

*Primary Examiner*—Maynard R. Wilbur
*Assistant Examiner*—H. A. Birmiel
*Attorney, Agent, or Firm*—Robert B. Stevenson

[57] ABSTRACT

Remotely generated coded pulse trains are transmitted to seismometer group decoders and to individual seismometer decoders for the purpose of selectively activating a number of function circuits. The functions controlled by the pulse actuated circuits include simple connect-disconnect operations for entire groups prior to the recording period to expedite spread set up for common depth point recording, initiating the seismic source and connecting individual seismometers within each group during the recording interval to change array geometry as a function of time. Additional functions which may be changed by the coded pulse trains during the recording interval are the individual seismometer amplitudes, and phases, permitting time variable beam steering as well as the frequency response of entire groups or individual seismometers to attenuate noise. By changing the seismometer array dimensions as well as the individual array elements amplitude and phase responses during the recording period, reflections signal to noise ratios can be optimized without the necessity of recording the individual elements.

6 Claims, 4 Drawing Figures

REMOTE SEISMOMETER CONTROLLER

BACKGROUND OF THE INVENTION

The present invention is generally concerned with seismic prospecting and the data acquisition systems used to gather seismic information. More particularly, it relates to the method of selectively activating a number of seismic function circuits located at seismic source positions, group interconnection points, and seismometer locations spaced at intervals along the surface of the earth.

In seismic prospecting, subsurface information is obtained by transmitting acoustical energy from a surface or near surface source point downward into the earth formations and then detecting the reflected or refracted seismic waves on a series of spaced individual seismometers located in a line or spread along the earth surface. The reflected seismic waves along with undesirable noise waves are converted into equivalent electrical signals by a number of individual seismometers. To attenuate the noise waves the electrical signals from adjacent individual seismometers are frequently interconnected to form group array signals, which are then transmitted by means of a multi-conductor cable to a remote multi-channel recording apparatus where the group signals are separately amplified and reproducibly recorded on magnetic tape. After reproduction and display the reflection waves are identified, timed and correlated from channel to channel to provide valuable information concerning the depth and character of the subterranean acoustical interfaces.

The accuracy with which the subterranean interfaces can be identified and located depends for the most part on the amplitude of the extraneous noise waves which are recorded concurrently with the desired reflection signals. The preferred method of increasing the signal to noise ratio and hence the location accuracy has been to employ a high source-seismometer multiplicity factor. Electrical signals from arrays of up to 144 seismometers are combined to form a single group signal. Likewise, multiple sources are commonly used to further increase this multiplicity. Most recently the common depth point (CDP) method as described by Mayne in U.S. Pat. No. 2,732,906 has been used to still further increase this multiplicity factor. In the CDP method, reflection signals from a common subsurface point, but different separated sources and seismometers are first corrected for geometrical path differences, and then combined in various ways to produce a single composite signal. The number of such individual source and receiver signals from a common subsurface point that are combined, is commonly called fold. For example, in six-fold seismic data acquisition six separate source and seismometer positions are utilized to produce the six individual signals which are subsequently corrected and combined to form the composite signal.

A variety of field operating procedures have been developed to effectively acquire the large number of separate source and seismometer group signals required for multi-fold CDP work. Where six-fold techniques were employed in early CDP operations, present day practices utilize 12, 24 and 48 fold data recording. Typical examples of multi-fold recording methods are found in U.S. Pat. Nos. 3,553,057 by Woods, et al.; 3,217,828 by Mendenhall and 3,105,568 by Jolly.

The one essential in all CDP signal enhancement methods is that the individual group signals must be separately recorded and then corrected prior to combination. A variety of different correction and data processing procedures have been developed for improving the resultant signals produced by the CDP method. A representative procedure is given by Backus and Scheider in U.S. Pat. No. 3,571,788.

The separate recording requirement means that the seismometer groups must be connected and then disconnected from the multi-conductor cable a large number of times as the survey operations proceed along the surface. For a typical 10-mile line and 48 active groups spaced at 330 feet apart, a total of 160 connections and 160 disconnections must be made between each individual group and the multi-conductor cable. In early CDP multi-fold recording procedures, these connections and disconnections were performed by hand. A short time later multi-channel mechanical switches were developed to expedite field operations. These switches called "roll along" switches are in almost universal use in present day multi-fold field operations. A typical roll along switch is illustrated in U.S. Pat. No. 3,618,000. They will have 96 to 144 inputs and 24, 36 or 48 outputs, depending on the number of separate channels in the field recording apparatus.

These prior art roll along switches have a number of disadvantages. In particular, the dirty field environment and the large number of required switching operations combine to cause rapid failure of the mechanical contacts. Also the switches must be originally wired to operate in a particular manner. Normally this hand wiring is done to expedite the most common field recording method, namely in-line recording. When areal recording is desired, the switches must be rewired or special adapters constructed.

Another disadvantage of the present roll along switches involves the multi-conductor cable. Since each seismometer group must be connected to the input of the switch, a separate pair of wires is required. Where only a limited number of channels can be recorded, the majority of these wires remain unused, but add to the original cost of the cables and to the weight of the cables to be transported in the field.

The improvement obtained by the use of CDP recording is achieved by the in-phase summation of primary reflection signals after geometrical or "normal move out" corrections have been applied. At the same time, undesirable multiple reflections are attenuated by out of phase cancellation during this same process. The differences in normal move out between the two types of signals are dependent on the source-seismometer separation, the velocity of the subsurface beds and on the depth to the desired reflecting interface. As depth, and hence the time interval from the time of initiation to the reflection arrival time increases, the normal move out differences decrease, and therefore to achieve adequate multiple suppression, very large source-seismometer separations are required. Long seismometer spreads exceeding several miles are recorded in many areas to provide sufficient normal move out for effective multiple attenuation at the deeper portions of the records.

Each seismometer group consists of a number of individual seismometers deployed in an array. The seismometer output signals are combined at a group interconnection point from which they are transmitted down a multi-conductor field cable to be reproducibly recorded in the field recording apparatus. As a result of this combination, the individual seismometer signals cannot be separately corrected for normal moveout, and consequently the desired composite reflection signals will be progressively attenuated by out of phase summation as the seismometer array increases in size. However, the array's ability to cancel troublesome low frequency noise waves increases as the seismometer array increases in size. The normal move out of primary reflections is greatest early in the recording interval, where the shallowest reflections are observed and becomes progressively smaller with increasing recording time. The relative amplitudes of noises to signal waves, on the other hand, is smallest earliest in the recording period and progressively increases with recording time. A seismometer array with small areal extent will detect shallow reflections having large normal moveout at an adequate signal noise ratio since the noises are relatively weak when compared to the early reflected signals. A large seismometer array will best detect the deeper reflected signals having smaller normal moveouts but lower signal amplitudes in the presence of increased noise level.

The differing normal moveouts between shallow and deep reflection signals has created a problem which is solved according to the present invention by changing the array geometry during the recording interval. The "best" fixed array as used in the prior art is only optimized for one reflecting horizon and one set of background noise conditions. Changing the areal size of the array permits each reflection signal to be optimized for the particular noise pattern existing at its particular time of arrival.

The several mile long spreads used with CDP techniques also introduce other problems concerning the frequency response of the reflection signals. After proper corrections, the individual source-seismometer signals are summed to form the composite CDP trace. To obtain the best quality composite signal, the reflection signals from each individual seismometer should be as nearly identical as possible. In some areas, due to the very much longer paths and oblique angles involved, the farthest seismometer receives a reflection signal which has undergone a different earth filtering than the closest seismometers. To compensate for this effect, it is desirable to change the frequency response of one of the seismometers relative to the other. This is not easily accomplished in CDP work because the farthest seismometer remains stationary and as the operation proceeds along the surface, it eventually becomes the nearest seismometer, thereby making any fixed or manually adjustable seismometer filters impractical during routine data acquisition. Time variable filters separately actuated at each seismometer position in accordance with the present invention will provide uniform signals which can then be composited with the highest signal-to-noise ratio.

The spatial response patterns of seismometer arrays become sharper and more directional as the number of elements and the areal dimensions increase. It is well known that by changing or tapering the signal amplitudes from different seismometer elements within each array prior to combination at group interconnection points, improved directivity can be obtained. Also, by changing the phase relations between seismometer elements, the directivity pattern can be steered in a preferred direction. Even with such simple 180° phase adjustments as accomplished by simple polarity reversals, this beam steering is quite effective in improving the signal levels in areas where steeply inclined acoustical interfaces are the objectives of the geophysical survey. Heretofore, when such amplitude and phase variations were needed to improve the signal-to-noise ratio, they would be manually implemented at each seismometer. Under these circumstances no changes were possible during the recording time and therefore only one array response pattern was available for all the different reflection wave arrivals. By varying the amplitude and phase as a function of time in accordance with the changing attitude of the subsurface acoustical interfaces improved reflection signals are obtained.

In addition to beam forming, many other spatial filtering techniques are best applied on a seismometer-by-seismometer rather than a group-by-group basis. Individual seismometer control is not possible with existing seismic systems except by increasing the number of separate recording channels. By remotely controlling the operation of seismometer circuits, the expense and complexity of field systems having a large number of reproducible recording channels can be avoided.

PRIOR ART

To properly correct the seismometer group signals for the effect of variable near-surface weathering, it is necessary to record and study the direct waves from the source to the seismometer. The direct waves which have not penetrated any great distance into the earth are best detected by single seismometers, while the desired reflection signals are best detected by a multiple seismometer group array. To accomplish both these objectives, it has been heretofore known to switch between adjacently located reflection arrays and single direct wave detectors, as shown in U.S. Pat. No. 3,212,599 by Johnson. In the Johnson system, additional conductors are required in the multi-conductor cable to supply the DC current needed to close the remote switching relays. With the increased weight and cost of extra pairs of wires in modern multi-conductor field cables, this system has not been adopted by the geophysical prospecting industry.

Tvedt in U.S. Pat. No. 3,411,604 eliminates the extra conductors by using a DC current fed along the same conductors that transmit the seismic information and a remote polarized relay in conjunction with a pair of zenner diodes. Tvedt's DC system provides for only a single switching relay at each group location, thereby limiting the possible control functions.

Hibbard in U.S. Pat. No. 3,624,599 uses radio frequency signals to actuate a single remote seismometer switching relay and adds a fail-safe circuit to complete the switching action when the seismic energy has arrived at the single direct-wave detector.

A multiple detector switching system is described by Roever in U.S. Pat. No. 3,189,870, where time-delay switches interposed between each detector are sequentially closed after the initiation of the seismic source. The switching sequence is fixed by time delays built into each switch and hence no variations are possible to meet changing noise environments.

Another remote switching system with two separate functions is taught by Burg in U.S. Pat. No. 3,539,983, where in addition to a simple connect-disconnect operation the control of individual group gains is contemplated. A single switching sequence is provided by a sequential timer and switching matrix located at each group position which, although time-varying, cannot be changed during field operations.

The remote control of seismic sources by coded pulse radio transmissions is shown by Stone in U.S. Pat. No. 3,465,286. Although only the single function of detonating the explosive charge was envisioned, the coded pulse train was used in a manner to prevent radio interference from causing false detonation commands.

A coded pulse-switching system for rapidly multiplexing electrical seismometer group signals to permit transmission over a coaxial cable transmission line is described by Angelle in U.S. Pat. No. 3,652,979. A remote pulse generator is used to sequentially open and close gates at each group location to provide the multiplexing action.

It is an object of the present invention to provide a seismometer group connect-disconnect function by means of a remote binary coded pulse train generator and a number of decoding switch units, which establish the basic multi-fold spread configuration prior to the recording interval. This same pulse train generator is then used during the recording interval to change other group related variables, such as frequency response, gain, etc., as a function of recording time in accordance with a field adjustable schedule.

Another object of the present invention is to extend the ability to remotely control various functions beyond the group arrays to the individual seismometer elements which make up each array. By controlling gain and phase of individual array elements the response of each array is optimized as a function of time to achieve the best possible reflection signal-to-noise ratio. Also, by connecting additional elements to the array during the recording period, improved noise rejection is obtained without the destructive cancellation of primary reflections caused by normal moveout differences between various array elements.

SUMMARY OF THE INVENTION

In accordance with the present invention, a series of changing pulse trains are produced at a control location. Each pulse train consists of a number of coded blocks, each of which controls specific function circuits located in remote decoder units along the seismic spread at the source position, at group interconnection points, and within or at the individual seismometers which make up each group. The pulse train is repeated at very short time intervals such that each of the controlled functions may be changed at these short intervals during the seismic wave recording period. The particular sequence of pulse train codes to be used is manually selected or programmed on a pulse code generator by field personnel. Alternatively, it may be selected from a prerecorded library of coded pulse trains stored on magnetic tape.

In normal geophysical prospecting procedures, the seismic spread is made up of a number of different groups which in turn are each made up of a number of individual seismometer elements. Decoder units are placed at each group interconnection point to control which groups will constitute a given spread and also to control other functions, such as frequency response and gain, which relate to the composite group signal. Other miniaturized decoder units are located within or adjacent to each seismometer in each group to activate or deactivate that particular seismometer as well as changing its amplitude and phase response.

The coded pulse trains may be sent to the remote decoder units by radio or over the same wire lines used to transmit the seismometer signal back to the amplifying and recording apparatus. When wire lines are used for control signal transmission, the pulse repetition rate is high enough to permit good frequency separation between the relatively low frequency seismic signals and the high frequency control pulse signals.

The coded pulse trains are started before the seismic source is initiated. During this pre-initiation period, the pulse trains activate the required seismometer groups to form the initial spread and the initial number of individual seismometers within each group. Also, the beginning frequency, gain and phase functions are initialized for each seismometer and group. A special source initiation pulse train or code block is then used to initiate the seismic source which is also linked to the pulse code generator by wire line or radio. Immediately after the transmission of the command to initiate the source, the code blocks within each sequential pulse train are varied to open and close circuits in the remote decoder units according to the time varying schedule originally selected by the equipment operator.

DETAILED DESCRIPTION OF THE PREFERRED EMBODIMENT

Figure 1:
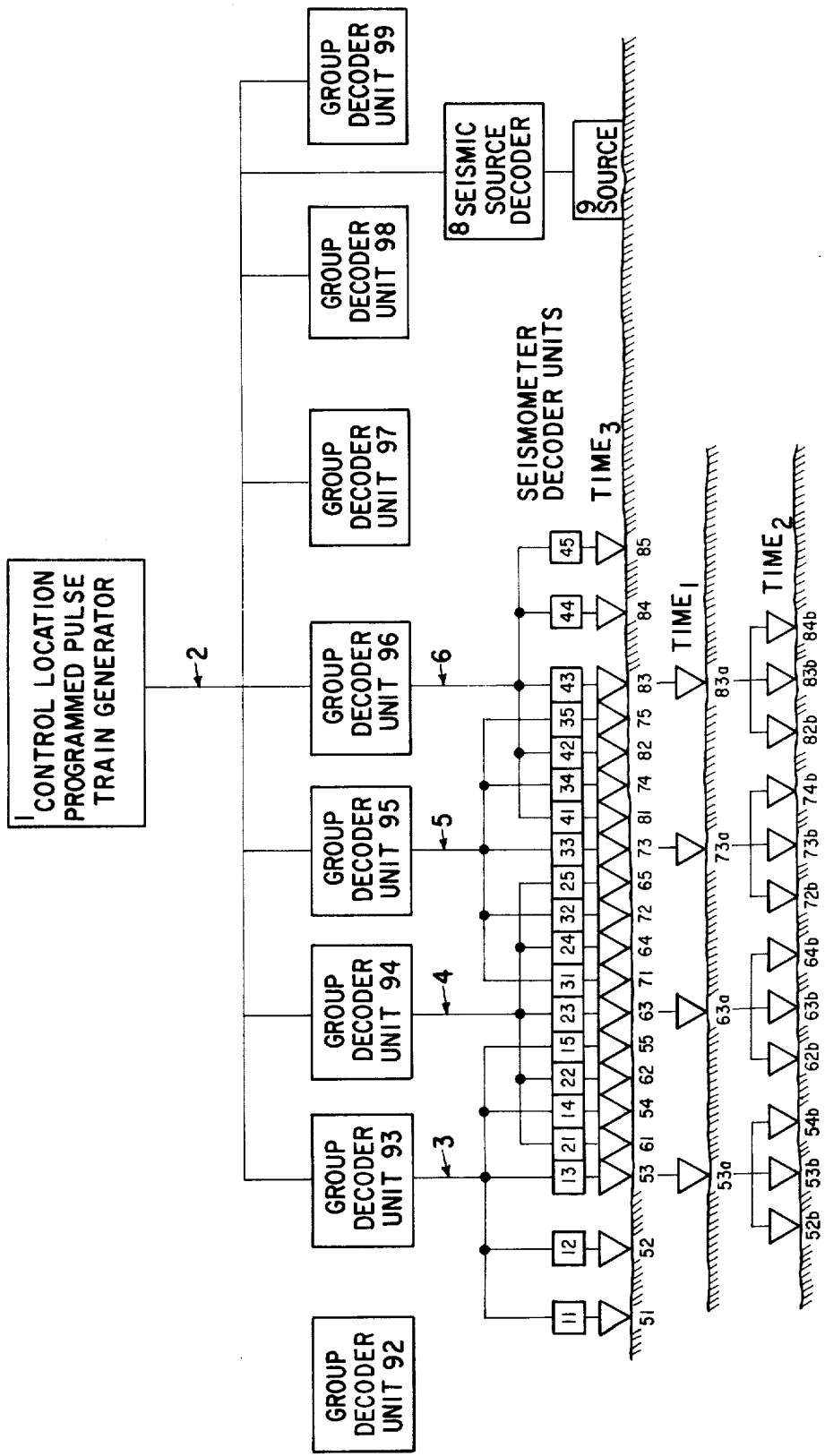
FIG. 1 is a block diagram showing the three basic portions of the control system used to implement the present invention.

Attention is directed to FIG. 1 which illustrates the general control method used in the present invention. Programmed pulse train generator 1 is located at a remote position which may be separated from the seismic spread. In conventional geophysical prospecting using multi-conductor cables between the seismometer groups and a central recording unit, the pulse generator 1 would be mounted in the vehicle carrying the multi-channel amplifying and reproducible recording apparatus. Using independent portable recording units at each group location and a radio communications link as taught in co-pending application Ser. No. 298,153 by Broding and Freeman, pulse train generator 1 would be located in the vehicle used with the seismic source.

Programmed pulse train generator 1 produces an initial predetermined code train of binary pulses at a rate determined by a self-contained clock. The coded pulse train is transmitted by communication link 2 to all group decoder units 92–99 (plus others not shown) deployed at spaced locations along the surface of the earth. The coded pulse train is divided into blocks among which are those with unique addresses designed to activate particular predetermined group decoder units. Enough group addresses are provided to permit each group on a given line to be separately identified and activated. Assuming a maximum line length of 60 miles and a group separation of 330 feet, a pure binary code of 10 bits or a BCD (binary coded decimal) code of 12 bits is required for group addressing.

For the recording setup illustrated in FIG. 1 the desired seismic spread consists of the groups connected to the four decoder units 93–96, while the groups connected to the remaining decoder units 92, 97–99 plus others not shown, are to remain inactive. Initially all group decoder units 92–99 are in the inactive low drain receive mode. When an address code block corresponding to a particular unit is received from programmed pulse code generator 1, that unit is activated and shifts into the operate mode where additional function circuits within the decoder are energized and seismometers which form that group are connected to the recording apparatus.

At this first stage of the operation, receipt of the group address portion of the coded pulse train by the group decoder units has caused a predetermined pattern of groups to become active, and hence to form the desired seismic spread. The coded pulse train therefore has performed electronically the same function as is presently accomplished by mechanical means using the troublesome mechanical roll-along switches discussed above.

Within each group decoder unit, additional control function circuits have been activated upon receipt of the unit's particular address code. Typically such circuits would be used to control group signal gain and frequency response. Simple attenuation circuits to control gain are well known in the prior art, and a more sophisticated operational amplifier circuit to accomplish the same function is shown in co-pending application Ser. No. 364,767 by Briggs and ab Ioworth. A wide variety of switch-control filter circuits to change signal frequency response are also known in the prior art. A good example is given in U.S. Pat. No. 3,621,412 by Keeling.

A group function code block containing sufficient binary information to control all the function circuits in each group decoder unit follows the group address blocks. By way of example, suppose that a separate gain control circuit and filtering circuit were incorporated into each group decoder unit each of which required eight separate switch positions. Under these conditions the group function code block would contain at least four binary bits if pure binary codes were employed, or two decimal numbers requiring eight bits if the binary coded decimal (BCD) format was used. The first coded pulse train received in addition to activating the group selected to form the seismic spread also sets the corresponding initial gain and filter circuits for each group. Upon group decoder unit activation, the individual seismometers are in addition to being connected to the recording apparatus also connected by communication links 3–6 through their corresponding group decoder units 93–96 to the program pulse generator 1 by means of communication link 2. Within or immediately adjacent to each seismometer 51–55, 61–65, 71–75, 81–85 are seismometer decoder units 11–15, 21–25, 31–35, and 41–45.

Each seismometer decoder unit contains address and control function decoding circuits similar to the group decoder units described above. The coded pulse train also contains individual seismometer control blocks which respectively activate corresponding circuits in each seismometer decoding unit. A portion of the seismometer control blocks activates switching circuits which connect predetermined individual seismometers to each group. After the seismometer decoders are actuated, control circuit functions are performed in accordance with a second portion of the seismometer control block in the same manner as used in the group decoders. Typical seismometer control functions would include circuits to adjust amplitude and phase response of each seismometer array element, thereby permitting array optimization and beam steering if desired.

Just as with the group decoder units, the receipt of the first coded pulse train connects the individual seismometers to the group, and hence to the recording apparatus at the same time initializing the seismometer function control circuitry. Each coded pulse train contains a special block set aside for time zero synchronization and source initiation. When initialization has been completed, that is, all required groups and seismometers connected and the required functional controls set, a unique source initiation code sequence is sent as a special time zero block. Alternatively an entire separate source initiation train may be transmitted over the first communication link to a separate source decoder unit 8. If desirable, a separate wire line or radio link between the control unit and the seismic source can be used for this purpose. When the special source initiate code block or pulse train is received by the source decoder unit 8, the seismic source 9 is activated, thereby generating seismic waves.

If dynamite is used as the source, the receipt of this unique initiate code or pulse train would cause the charge to be detonated. If on the other hand the vibrator was used as the source, receipt of the source initiate code or pulse train would cause the vibrator to start inputting a vibratory signal into the ground. With whatever type source is used, transmission of this special initiate code block or pulse train establishes the zero reference time, or shot break time, relative to which geophysical corrections and ultimately the reflection travel times are measured. An entire spearate pulse train may be separate to source initiation when needed to provide the ultimate margin of safety obtained by using the largest possible number of pulses to form the unique source initiation code. Normally a smaller source initiation code block is added to the coded pulse train for this purpose.

When time varying source control is desired, as might be the case when frequency and amplitude control of a mechanical vibrator is desired, this special source initiate block is subsequently utilized to provide time varying source control functions.

Immediately following transmission of the source initiate-zero time block or pulse train, a programmed series of time varying coded pulse trains is transmitted in sequence over communication link 2. Each pulse train contains predetermined address and function control blocks, which upon receipt by the group and seismometer decoder units cause different seismometers to be connected and disconnected to each group and various predetermined changes in the respective control circuits to occur. Since the coded pulse trains are sent out in a time sequence, each time a train is received a change in configuration or signal amplitude phase or frequency response can occur. By this means, time varying changes in spatial and temperal filtering characteristics are implemented.

The maximum pulse train duration will determine the minimum intervals at which the programmed changes can be made. The maximum pulse train duration will in turn be established by the pulse repetition rate, and the number of pulse positions required to transmit all desired address and function control blocks, as well as the appropriate gaps needed to separate and identify individual blocks within each train, and the necessary beginning and end of train pulses required between successive coded pulse trains.

The main constraint on pulse repetition rate is imposed by the type of communication link used. If control signals are sent over the long multi-conductor field cables in current use, the upper frequency response, and hence the pulse repetition rate will be limited. The multi-conductor field cables presently used to transmit the low 10–100 hertz seismometer signals several miles, will also transmit control pulses at rates up to 36,000 bits per second without serious distortion. Although pure binary coded pulse trains provide the most efficient method of controlling the source, group and seismometer circuits, BCD (binary coded decimal) codes will be used to simplify the following descriptions. It should be recognized that when BCD codes are used in place of binary codes, the length of each coded pulse train will be increased, and therefore the control train repetition rate will be decreased, since the same control information requires the larger number of bits in BCD.

Assuming BCD coded pulse trains will be used to control a seismic spread consisting of 24 groups, each group consisting of 12 individual seismometers, and the group control functions require four BCD digits and the seismometer control functions require two BCD digits in addition to their respective address codes, a complete coded pulse train could be transmitted every one-fifth second over the limited band width multiconductor cables. This one-fifth second repetition rate would permit 20 to 30 changes in group array configuration and response during a typical recording interval of 4 to 6 seconds. Faster changes could be made if the number of seismometers were reduced, if binary rather than BCD codes were used, or if the band width of the transmission link could be increased. However, five changes per second are considered adequate for most function variations required, using conventional array optimization techniques.

For safety considerations, when dynamite is employed as the source of seismic waves, source initiation may be controlled by a unique pulse train similar to the train used to control the desired group and seismometer decoders. In this case, only when the entire source initiation pulse train has been correctly decoded is the source initiated. Alternatively, as pointed out above, a special unique source initiation code block can be inserted into the code pulse train to detonate the dynamite shot.

When time variable source control is desired, as might be the case when a vibratory source using elongated signals is employed, the source initiation pulse train is eliminated, and the extra source control block is added to each coded pulse train. These unique source control blocks provide a series of functional controls for the source every 200 milliseconds under the above assumptions.

This analysis illustrates that in conjunction with existing field equipment and operational techniques, my invention provides time variable, source, group and seismometer control functions at time intervals frequent enough to be compatible with routine prospecting requirements. If a radio transmission link is substituted for the multi-conductor cables, the pulse repetition rate, and therefore the speed of control function change, can be increased beyond any reasonable requirement.

One application of my coded pulse train system is seen in the lower portion of FIG. 1. Here the pulse trains are used to perform simple seismometer connect disconnect operations as a function of a recording time. Prior to source initiation, the initial pulse train contains individual seismometer address segments which activate seismometer decoder units 13, 23, 33 and 43 within the active groups corresponding to group decoders 93, 94, 95 and 96. As a result, these groups consist of a single seismometer each. The source is then initiated at time $T_1$ and the direct and refracted waves detected by seismometers 53, 63, 73 and 83 are reproducibly recorded for analysis and determination of weathering corrections. Coded pulse trains containing these same addresses are sent out after source initiation until all direct waves have been recorded at time $T_2$. The control signal generator is programmed to add extra address code blocks to each coded pulse train at time $T_2$. Responding to these new address code blocks, seismometer decoder units 12, 14, 22, 24, 32, 34, 42 and 44 become active and connect seismometers 52, 54, 62, 64, 72, 74, 82 and 84 to their respective groups.

Group 93 is therefore at time $T_2$ made up of three seismometers 52, 53 and 54, whereas during the time interval between $T_1$ and $T_2$ it consisted of single seismometer 53. The small groups represented by three seismometers are best suited to recording the shallow seismic information, where the large normal moveouts characteristic of the early reflection signals can be handled with the limited dimensions of the array. During this period the reflection signals are strong enough to override what noise is not suppressed by the limited array. At time $T_3$ after the shallow reflection signals have been recorded, the coded signal generator is programmed to add additional address code blocks, thereby activating seismometer decoder units 11, 15, 21, 25, 31, 35, 41 and 45. This connects two more seismometers into each group, thereby enlarging dimensions of each array to better cancel the noise which predominates at the end of the record, while not interfering with the low normal moveout signals from the deeper acoustical interfaces.

The coded pulse train generator 1 shown in FIG. 1 is typically constructed from commercially available digital components. It consists of a master control clock which produces a series of pulses at a predetermined rate, and a number of divider circuits, counters, shift registers, And gates, Or gates, and thumbwheel BCD switches, which collectively form the clock pulses into the desired control blocks in a predetermined sequence according to the manually adjusted switch positions. A variety of such pulse code generator circuits are well known to those skilled in the art. Rather than construct a special pulse code generator, any one of a variety of commercial microcomputers could be used for this purpose. The small size and low power requirements of present day microcomputers are compatible with geophysical field operation requirements. A typical microcomputer which could be used to generate the coded pulse trains in the Intel Model mes-8 which is described on pages 6–19 of the Feb., 1973, Catalog of Intel Corp., 3065 Bowers Ave., Santa Clara, Calif., 95051.

The group decoder units 92-99, the seismometer decoder units 11-15, 21-25, 31-35, 41-45 and the seismic source decoder unit 8 are constructed from a number of commercially available digital circuit modules. Arranging a number of such modules in series parallel will provide any desired number and order of control functions. Separating the modules into group decoder packages and individual seismometer control packages which can be mounted within the individual seismometer cases provides the maximum flexibility in field operations. The total number of coding and decoding modules required will be determined by the particular control functions to be executed and hence the type of coded pulse train used.

The coded pulse trains may be configured in a variety of different ways depending on the number and timing of the control functions to be executed. For example, group address code blocks may be used only on the first pulse train to activate the desired groups which then remain on for the entire recording sequence. Alternatively, group address code blocks may be included in each sequentially transmitted pulse train to permit different groups to be connected and disconnected during the recording time interval, thereby changing the overall spread dimensions as a function of time.

In a similar manner the group control circuits within each group decoder unit can be set once at the beginning of the pulse train sequence and remain unchanged, or can be changed at a relatively slow rate during the recording time interval by including group control function code blocks in only every fifth, tenth or nth coded pulse train. Alternatively, a group control function code block can be inserted after each group address block in each coded pulse train to provide group control functions at the pulse train repetition rate.

Seismometer address code blocks can be inserted after each group address to independently connect and disconnect individual seismometers within each group. Using this configuration, the seismometer in group 1 may be connected differently than those in group 2 or 3, and can be changed independently as a function of time. However, a single seismometer address code block or segment of a code block can be used to control all the seismometers within each group the same way. Under this procedure each group contains the same numer of seismometers arranged in the same way on the ground. Each seismometer decoder at the same relative position in all groups would have the same address. A seismometer address code would then be transmitted only once per pulse train. When the address code activates seismometer 3, all number 3 seismometers in all active groups would be connected. A procedure where only every nth pulse train would contain seismometer address blocks similar to that outlined above for the group control function blocks could also be used to provide a slower rate of group dimension changes where this could be tolerated. The individual seismometer function control blocks or segments could likewise be transmitted once for all groups, separately for each group, or periodically for each group.

Clearly in any optimum arrangement, the specific group and seismometer control codes will depend on the particular problem to be handled as well as the band width of the available transmission link which affects the pulse repetition rate, and therefore the speed with which the time variable control changes can be executed. By intermixing the various code blocks in different pulse trains, the maximum rate of control circuit changes can be achieved for functions requiring high time rates of change while providing slower changes for the control circuits which do not require the fast rates. The possible variations in code blocks, sequences, functional controls and order of control application are practically without limit, and therefore it is to be understood that the following description is made only by way of example and that the numerous changes in combination and arrangment of specific control function code blocks within any given coded pulse train may be resorted to without departing from the spirit and scope of the invention. In addition it is to be understood that the specific control functions to be performed in each decoder unit are given by way of example only, and any desired function which can be digitally controlled can be substituted without departing from the scope of the invention.

To simplify the following detailed description, the following operational requirements will be assumed: First, all required groups will be in numerical sequence and will be selected only one at the beginning of each recording sequence and will not change during the recording period; thus only 24 consecutive groups from a total of 999 possible groups will be called at any one recording interval; second, all groups will be identically controlled by the same group function control code, such that a single set of control functions described by four BCD digits will be simultaneously applied to all active groups, and this control will be executed at the beginning of the recording period only; a dynamite source will be employed, requiring a single time zero command to cause detonation, and therefore the time variable source control signals will not be needed; fourth, less than ten discrete seismometer combinations will be used in each group during a recording interval, so the group configuration can be controlled by a single BCD digit. For example, if a BCD 0 is received, the group would consist of a single seismometer at the center of the array as shown in the lower portion of FIG. 1. When a BCD1 is received, a circuit is closed, connecting two additional seismometers on each side of the center seismometer enlarging the array to three seismometers. As additional BCD numbers are received the seismometers in symmetrical pairs on both sides of the center will successively be added until an array of 19 seismometers is realized with the receipt of BCD digit. Finally, a single seismometer control function requiring only a single BCD digit will be utilized. This seismometer control function by way of example will be the amplitude of the individual seismometer output signals to permit time variable array tapering to optimize reflection signals arriving vertically. Beam steering will not be needed and consequently no phase control circuits are included.

Figure 2:
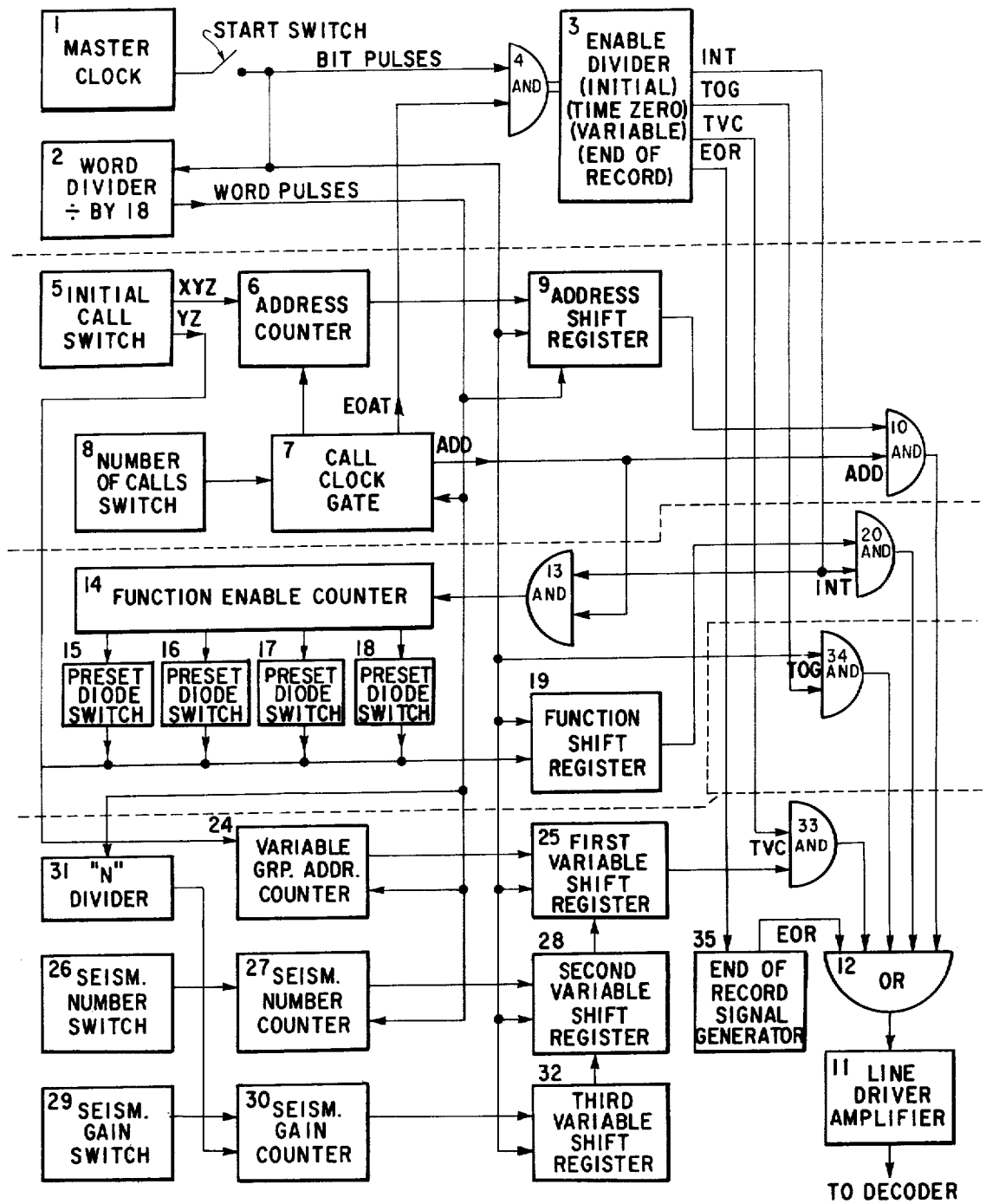
FIG. 2 illustrates the remote control code generator portion of the system shown in FIG. 1.

FIG. 2 is a diagrammatic illustration of the control unit used to generate the coded pulse trains. Master clock 1 provides timing pulses at the basic bit rate. The clock pulses are counted down 18 times in word divider unit 2 to provide synchronization pulses for an assumed basic word length of 18 bits in this example. The clock pulses are also counted down by enable divider 3 to provide signals for initializing (INT), time zero generation (TOG), time variable control (TVC), and end-ofrecord (EOR) indication to stop the data acquisition process. Details of such divider units are well known in the computer art and will not be discussed here. And gate 4 prevents clock pulses from reaching the enable divider 3 until call clock 7 outputs an end-of-address transmitted pulse (EOAT) following the transmission of the address code blocks. Collectively, the master clock 1, the word divider 2, the enable divider 3, and the And gate 4 comprise the clock controller portion of the control unit.

The enable divider 3 and the call clock gate 7 together establish the basic time sequence for (1 addressing the series of remote group and seismometer decoders, (2) setting the initial group control function characteristics, (3) generating a unique time zero code to activate the seismic source and begin the recording process, (4) to supply a sequence of time variable commands to the seismometer stations which are used to connect and disconnect seismometers and control the amplitudes of individual seismometer signals and, finally, (5) to produce an end-of-record pulse to stop the entire control process and reset the decoders for the next sequence.

The enable divider 3 provides the initial (INT) enables signal which controls And gate 20, the time zero gap (TOG) signal which controls And gate 34, the time variable control (TVC) enable signal which controls And gate 33, and the end-of-record (EOR) signal. The call clock gate 7 provides the address (ADD) enable signal which controls And gate 10 as well as starting the function enable counter 14 through And gate 13.

The address call generator portion of the control unit generates the address code blocks used to activate the desired remote decoder units. Since a single numerical sequence of decoders will be employed according to the original operational requirements, a single input address and a progressive counter is used in lieu of 24 separate input address units. Initial call switch 5 is manually adjusted to select the first address in the sequence of decoder addresses to be called for a particular recording operation. Although a single initial call switch 5 is shown in FIG. 2, it is to be understood that a separate switch is required for each binary coded dicimal digit in the decoder address. Since there are 999 possible group decoder addresses, three such switches will be required although for simplification only one is shown. The switches are commercial BCD thumbwheel switches which can be manually set to any decimal digit. Since a three-digit call will be necessary, the equipment operator flips each thumbwheel until the desired first group address appears on the three adjacent dials. Each thumbwheel switch is connected to an address counter 6 which is set in accordance with the manually inserted address number. A typical address counter is RCA Model 4029A which like the subsequent RCA module references is fully described in the RCA Solid State Data Book, Series SSD 203A, 1973 Edition, Published by RCA Solid State, Box 3200, Somerville, N.J. 08876.

After the initial address has been entered, the address counter 6 advances one BCD digit for each word pulse received from call clock gate 7. The word pulses from word divider 2 pass through call clock gate 7 which is controlled by number of calls switch 8. The number of calls switch is preset to pass a predetermined number of word pulses which reflect the desired number of decoder units to be activated at any one time. This, in turn, is determined by the number of separate channels available for recording seismic data. In the example, 24 channels will be utilized and consequently the number of calls switch 8 is set to 24. The clock gate 7 has an input obtained from word divider 2 and an output which enables address counter 6 for the predetermined number of addresses (24) originally set into it.

After the first address number from initial call switch 5 has been entered into address counter 6, upon receipt of a word pulse the counter advances one count from this preset number for a total of 24 additional address numbers. The call clock gate 7 also provides an address (ADD) enable pulse which extends for 24 consecutive 18-bit words and an end-of-address transmitted pulse (EOAT) following the 24 addresses. The sucessive BCD numbers produced by address counter 6 are transferred to address shift register 9 where they are clocked out in serial form at the bit rate determined by master clock 1. A typical shift register for this application is RCA Model No. 4021 which is also described in the RCA Solid State Data Book supra. Every 18 pulses from the master clock 1, an address number from address counter 6 is coded and sent out through And gate 10, Or gate 12, line drive amplifier 11 to the remote decoder units. And gate 10 is activated by the address enable signal generated by call clock gate 7 such that only 24 successive addresses will be transmitted through Or gate 12 to the line driver amplifier 11. The 24 successive three-digit address blocks make up the group address portion of the coded pulse train. Since each BCD digit requires four bits plus parity, a total of the 15 of the 18 available bits in each word are used.

Call clock gate 7 also outputs an end-of-address transmission (EOAT) pulse which opens And gate 4 to permit the enable divider 3 to begin outputting the remaining control signals. By this means any number of group decoder units may be activated since the group address code block can be varied in length by merely changing the value in number of calls switch 8.

The first enable signal (INT) output by enable divider 3 initiates the control signal portion of the coded pulse train. The requirements assume that all groups would be identically controlled, requiring but a single group control block. Here it is to be understood that separate group control functions for each separate decoder unit could be employed by adding a control block to each individual address. The circuitry to accomplish this would merely be a replication of the single initial command generator shown in FIG. 2. Enable divider 3 produces an initial (INT) enable signal which opens And gate 13 and therefore allows the word pulses from word divider 2 to be input to function enable counter 14. Function enable counter 14 is typically an RCA Model 4017 described in the RCA Solid State Data Book supra. The four preset diode switches 15–18 each consist of a manually set thumbwheel switch and a diode matrix gate. When the first word signal following the address code block is received from the word divider by function enable counter 14, the diode matrix allows the switch lines representing the BCD numbers preset on the first thumbwheel switch to be transferred to function shift register 19. This sequence is repeated for the second, third, and fourth thumbwheel settings. Function shift register 19 is clocked out at the basic bit rate supplied by master clock 1 to form the second portion of the coded pulse train. A typical shift register used in this application is the RCA Model 4014 also described in the RCA Solid State Data Book supra. The initial function control words from function shift register 19 are passed through And gate 20 so long as the initial enable pulse is present and then through Or gate 12 to line driver amplifier 11.

After the correct group decoders have been actuated by the group address code block and the initial functions set in each by the initial code block, a time zero signal is added to the pulse train. The time zero signal consists of an all-ones code 18 bits long. It is provided by And gate 34 which passes the pulses from master clock 1 when the time zero gap (TOG) signal is present from enable divider 3. Upon receipt of this unique code of 18 consecutive bits, the seismic source is actuated and the recording process is started.

The fourth portion of the control unit provides the time variant code. It is used to generate the subsequent time varying code blocks in the pulse train which are used to control the seismometers within each group. The time control generator utilizes a series of up-down counters similar to the one used for address A 6. Typically, such counters as RCA No. 4029a may be used for this purpose.

The time variable addresses are only two BCD digits long since only one of 24 possible active units need be accessed during any time variable time period. The beginning time variable address code is entered by means of the last two of the original three thumbwheel BCD switches used to set up the initial spread. In initial call switch 5, the variable address counter 24 begins with this preset value and successively increases this value one digit every time a word pulse is received from word divider 2. The variable address counter 24 is clocked out and transferred to the first time variable shift register 25 which, in turn, is clocked out at the bit rate determined by master clock 1. Seismometer number switch 26 is used to manually enter, using a single thumbwheel, the starting number of seismometers to be used within each group. A single seismometer number switch is used to enter the starting number of the seismometer to be used in each group array, since according to the original requirements only 10 possible seismometer configurations are needed.

If a greater number of configurations are desired, additional digits can be added to the seismometer number switch. As shown in FIG. 2, seismometer number counter 27 will generate a sequential number for each word pulse. This code number is transferred to the second variable shift register 28 and clocked out at the bit pulse rate as determined by master clock 1.

As used in this particular application, the seismometer number switch is set on 1 to select a single seismometer for the first time increment, thereby enhancing the first refractive wave arrivals. Additional pairs of seismometers are then added on both sides of the single seismometer for each successive time increment, thereby expanding the seismometer array as the refection signals become weaker and the noise waves stronger. The weights or gains given each seismometer signal are determined by single digit seismometer gain switch 29 which sets the initial array weights into seismometer gain counter 30. The rate of advance of the successive gain values is controlled by word pulses from word divider 2 which have been modified by "N" divider 31. A typical N divider is RCA Model No. 4018 described in the RCA Solid State Data Book supra. The rate of advance of seismometer gain counter 30 is every nth word pulse. For example, if the N divider were set where N – 2, the amplitude values would advance at only one-half the rate that the seismometer pairs were added to the groups. Using other divider networks such as a divide by "M" counter in the seismometer number circuit (not shown), the number of seismometers and their respective amplitudes could be optimized as a function of time to provide spatial filters which reject a variety of interfering noise waves.

Other types of time varying commands can be utilized in a similar manner by adding additional function control switches, function counters, dividers, and shift registers. The output of seismometer gain counter 30 is transferred to the third variable shift register 32 which, in turn, is clocked out at the bit rate by the bit pulses from master clock 1. First, second, and third shift registers 25, 28, 32 are serially connected to generate the time variable portion of the coded pulse train such that the two-digit address code is followed by a single digit seismometer array number and a single-digit seismometer gain number. This time variable portion of the coded pulse train is gated by And gate 23 in response to the time variable enable signal from enable generator 3 to Or gate 12 and then to the remote decoder units through line drive amplifier 11.

It can be seen that the control unit code generator provides a coded pulse train for first addressing and selecting groups out of the 999 possible station codes starting with the first number preset as the initial call and generating successive calls to the total desired group number. Following this address, an initialization command code is generated for setting fixed functions at the group locations. Following the group selection and function initialization the time zero generator pulse is transmitted to detonate the seismic source and to give a starting point for the record. Next, the time variant code is sent for the duration of the recording. The time variant rate can be altered by selection of the master clock rate in addition to the use of N dividers as discussed above. Each group selected by the original call address is individually addressed and given commands at the time variant rate. The separate command rates can be individually altered by use of dividers for rates different from but synchronized to the time variant rate. The combination of addresses outlined above illustrate a typical combination of command and group selections. The functions need not be limited or confined to those illustrated. For example, the group selection could be made time variant to further increase the array filtering. Additional time variant commands could be used by duplicating the basic circuitry shown, realizing that the time variant interval is related to the bits used in the total command and the bit rate selected. The line driver amplifier which would also require the supplemental transmission of the master clock frequency to properly activate the remote decoder units. Preferably, it is a self-clocking transmission device such as an amplifier utilizing bi-phase encoding or pulsewidth encoding which does not require a separate transmission of the clock pulses for proper synchronization of the remote decoder units. Such self-clocking amplifier circuits are well known in the prior art.

The special end of record (EOR) signal which is required to synchronize the remote decoder units to the control unit is generated by end of record signal generator 35 when the EOR enabled signal is received from enable divider 3. This signal then passes through Or gate 12 and line driver amplifier 11 to the remote decoders.

The second portion of my invention involves the group decoder units which are located at some distance from the control unit decoder described above. These units decode the pulse train and activate the desired group function controls. They are located at the group intersection points where the seismometer string leads come together and are attached to the multi-conductor cable used to transmit the seismic information back to the amplifying and recording apparatus. The coded pulse train is transmitted over the same cable used to carry the seismic information as explained above. Where separate recorder units are located at each group position, the coded pulse train is transmitted by radio from the control unit to the decoder units.

Figure 3:
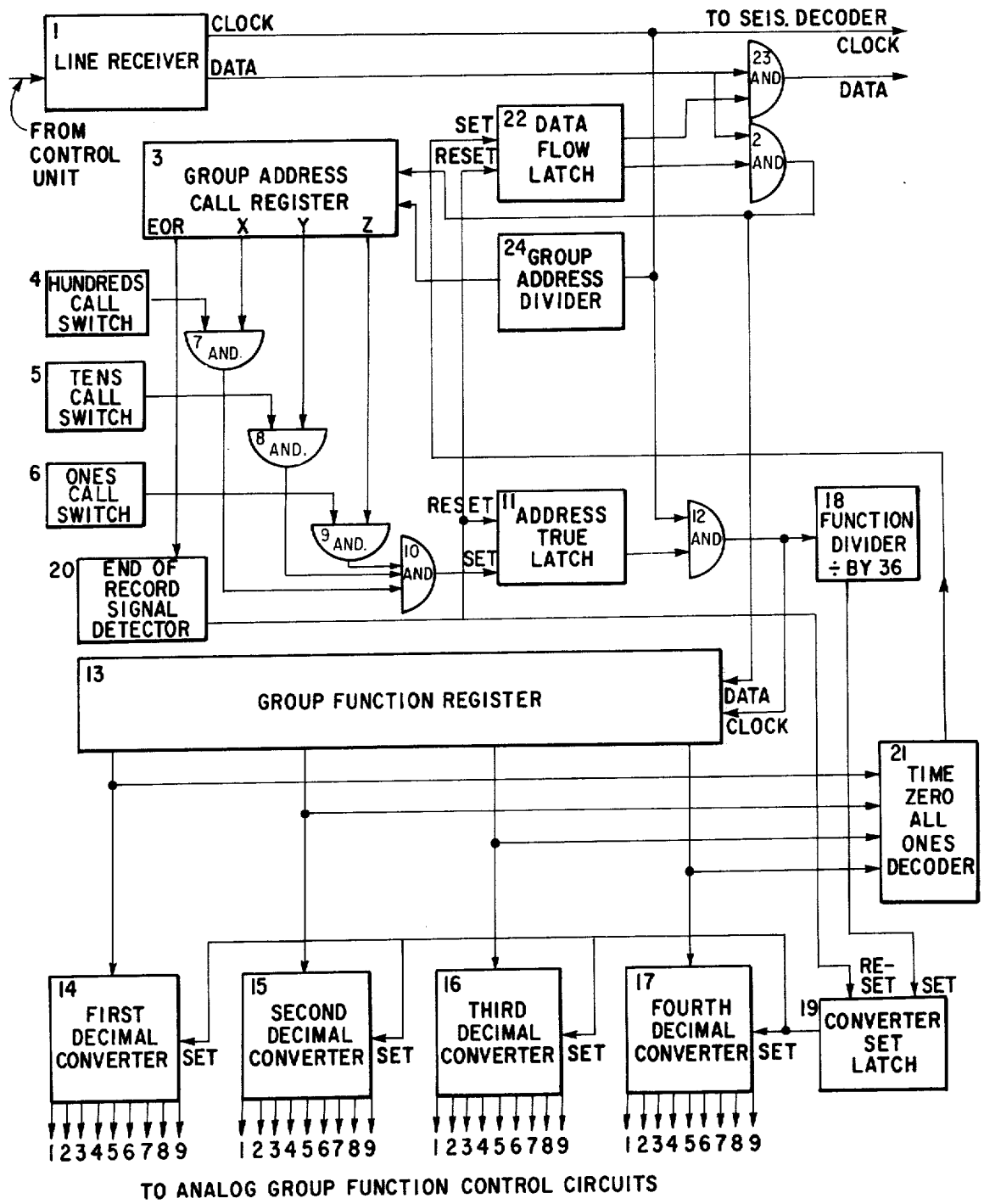
FIG. 3 is a schematic diagram illustrating the group decoder portion of the invention.

FIG. 3 illustrates a group decoder unit which corresponds to the control coder unit shown in FIG. 2. In FIG. 3, line receiver 1 accepts the coder pulse train signal and the clock frequency, whether separately transmitted or combined into a single self-clocking signal, and outputs the data and clock pulse signals at separate terminals. The digital data signals are first sent from line receiver 1 through And gate 2 to group address call register 3 where it is stored. A unique group address number is manually set into each group decoder unit by three BCD digit switches 4, 5 and 6. Only when an exact match between all three digits is obtained will a group address true pulse be passed by And gate 10, which then sets address true latch 11. Here it is to be understood that to simplify the illustration single connection lines are shown between the group address elements, while in reality each BCD digit requires four lines, each of which must be compared.

When the correct group address is received, address true latch 11 outputs a signal which opens And gate 12, permitting clock pulses from line receiver 1 to enter group function register 13 for the duration of the pulse train until an end of record (EOR) signal is received, resetting the address true latch 11.

Digital data is entered into group function register 13 from And gate 2. The four group function BCD digits remain in decimal converters 14, 15, 16, 17 for the duration of the pulse train until an end of record signal detector 20. The end of record pulse also resets the address true latch 11 prior to receiving a new address. Decimal converters 14, 15, 16, 17 were previously set by converter set latch 19 and hence do not respond to further bit changes in group function register 13.

The time zero signal consisting of all ones is read from group function register 13 by time zero decoder 21 which outputs a time zero pulse to data flow latch 22. This latch is set upon receipt of the time zero pulse which in turn closes And gate 2 and opens And gate 23, permitting the remaining data pulses to flow through the unit to the seismometer decoder and, at the same time, stopping further data pulses from entering registers 3 and 13. Data flow latch 22 is reset by receipt of the end of record pulse from end of record signal detector 20.

In this example, the words each consist of 18 bits. Group address divider 24 receives clock pulses from line receiver 1 and outputs a pulse every 18th clock pulse. This output pulse is used to reset the group address call register 3. Clock pulses also pass through the unit continuously to the seismometer decoders.

The third portion of my invention concerns the seismometer decoder units which execute the time varying commands to change the size of the seismometer array and the gain of the elements within the array. By this means, time variable spatial filtering is provided which can greatly reduce the extraneous noises which degrade the reflection data.

Present day field procedures where large seismic arrays are employed utilize subarrays or "strings" of nine seismometers permanently connected to a cable. These strings are joined together to form the larger array which may consist of up to 16 such strings for a total of 144 seismometers.

Figure 4:
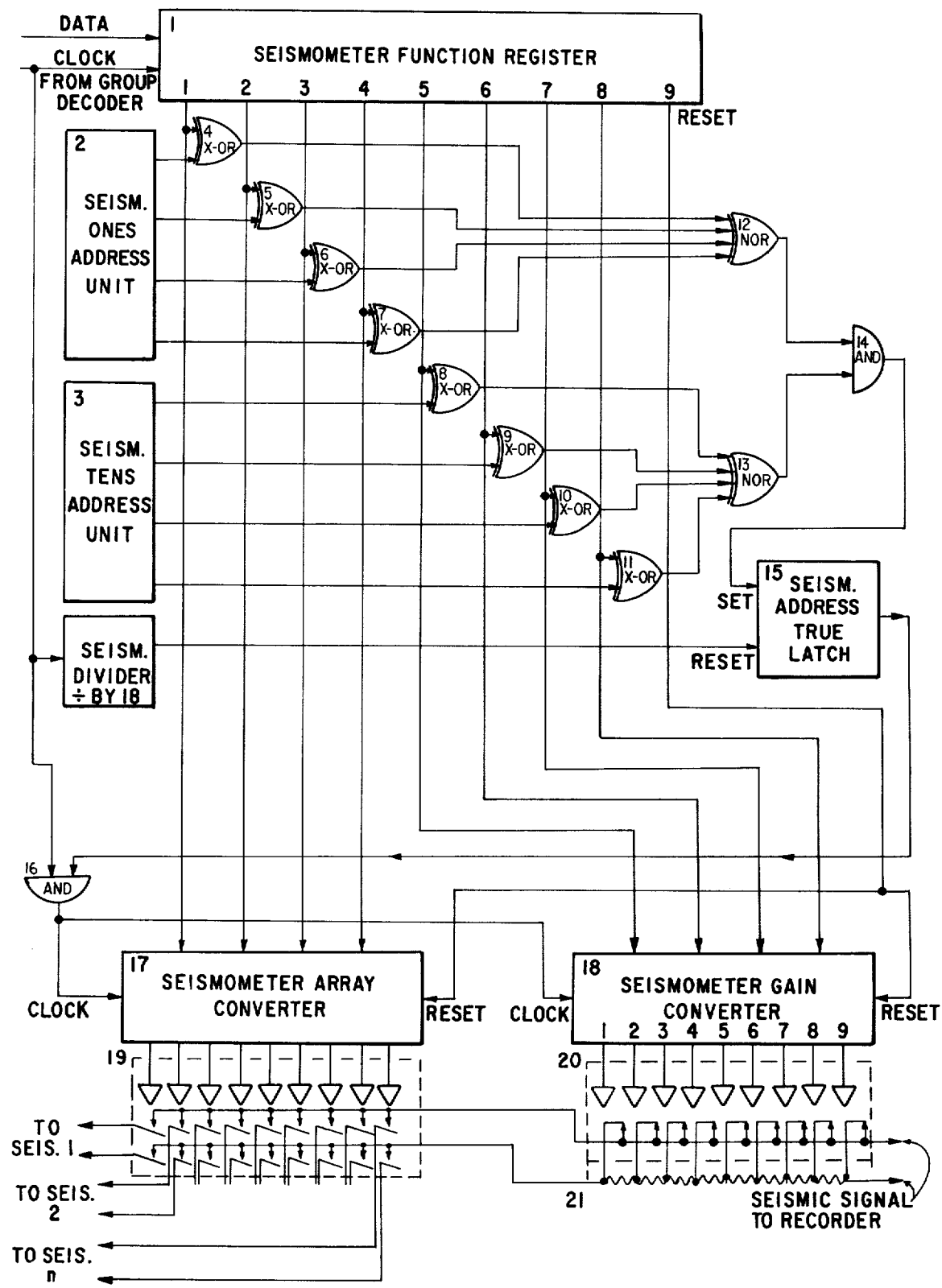
FIG. 4 shows the seismometer decoder portion of the overall system shown in FIG. 1.

The seismometer decoder unit shown in FIG. 4 is designed to be used with such strings of 9 seismometers each. Switching is provided for each seismometer within the string, but the gain is controlled on a string-by-string basis. Here it is to be understood that the individual seismometers switching and gain control circuits can be built into each seismometer by using the appropriate portions of the circuit shown in FIG. 4 and merely replicating the required modules on an individual seismometer basis. Where strings are used, the separate seismometer decoder units are to be preferred due to their lower cost.

FIG. 4 shows the string-type seismometer decoder unit which corresponds to the group decoder unit shown in FIG. 3 and the control unit shown in FIG. 2. The time variable data bit string from the group decoder unit is clocked into seismometer function register 1. This is a 9-bit register in the system shown and is typically 2 RCA Model 4014-A modules.

The two seismometer address digits are manually inserted into seismometer ones and tens address units 2, 3. Rather than the thumbwheel switches used for this purpose in the group decoder unit, a more permanent type of address units can be used and the decoder units themselves numbered and deployed during the field operations in an order which corresponds with the present seismometer address numbers. The stored seismometer address number from address units 2, 3 are compared with values in seismometer function registor 1 by exclusive Or gates 4–11, Nor gates 12, 13, and And gate 14. When a match is achieved And gate 14 passes a pulse which sets seismometer address true latch 15. The output of address true latch 15 opens And gate 16 which passes clock pulses to seismometer array converter 17 and seismometer gain converter 18. Typically, these converters are RCA 4028BCD/decimal decoders as described in the RCA Solid State Data Book supra. The converters 17, 18 operate analog switches 19, 20 which directly connect additional seismometers in each string to the array in the case of analog switch 19, or in combination with external resistance ladder 21, change the string's output gain by resistive attenuation in the case of analog switch 21. The ninth bit in seismometer function register 1 at the end of the command word provides the reset pulse to seismometer array converter 17 and seismometer gain converter 18.

Obviously, many modifications and variations of the present invention are possible in light of the above teachings. it is therefore to be understood that within the scope of the appended claims the invention may be practiced otherwise than as specifically described.

I claim:

1. In an improved method of seismic prospecting in which seismic waves generated by a source located at or near the surface of the earth are detected by a plurality of seismometers positioned at separated locations along the surface of the earth, said seismometers each producing an electrical signal corresponding to the ground motion at its particular location, said seismometer electrical signals being separately amplified and reproducibly recorded, including the steps of: producing at a control location a coded pulse train having a programmed sequence of binary signals chosen to effect predetermined seismometer control functions; transmitting said coded pulse train from said control location to a plurality of decoder units at said seismometer locations; and decoding said coded pulse train in said seismometer decoder units to activate seismometer control circuits in accord with said programmed sequence, the specific improvement comprising:
   a. changing said sequence of binary signals in accordance with a predetermined time variable program to produce a plurality of time varying coded pulse trains at predetermined time intervals;
   b. repeating said transmitting and decoding steps at said predetermined time intervals for each of said plurality of time varying coded pulse trains to provide time varying seismometer control functions in accordance with said predetermined time variable programs; and
   c. stopping said time varying coded pulse trains when a predetermined recording time period has elapsed, said recording time period being at least as long as the time required for seismic waves to travel from said seismic source to the deepest acoustical interface of interest and back to said seismometer furthest removed from said seismic source.

2. In an improved method of seismic prospecting in which seismic waves are generated by a seismic source at or near the surface of the earth, said seismic waves being detected by a seismic spread consisting of a plurality of siesmometer groups positioned at separated locations along the surface of the earth each said group being formed from a plurality of adjacent individual seismometers spaced in a pattern on the surface of the earth, each of said individual seismometers producing an elecrical signal corresponding to the ground motion at its surface location, said individual seismometer electrical signals being combined at group interconnection points to form a plurality of group electrical signals, separately amplifying and reproducibly recording each of said group electrical signals, including the steps of: producing at a control location a plurality of group address code blocks each having a unique binary code corresponding to one of a plurality of group decoder units; arranging said group address code blocks in a sequence to form a coded pulse train; transmitting before said seismic source is initiated said coded pulse train from said control location to said plurality of group decoder units; and decoding said group address code blocks within said group decoder units located at said group interconnection points such that when an individual group decoder receive it corresponding unique binary code a group activation circuit is energized, electrically connecting said group to an amplifying and recording apparatus thereby causing that group to become part of said seismic spread, and further including the steps of: producing at said control location a source initiation pulse train having a unique source code corresponding to a source decoder unit; transmitting said source initiation pulse train from said control location to said decoder unit located at said seismic source position following said coded pulse train transmitting step; and decoding said source initiation pulsed train within said source decoder unit such that when said unique source initiation pulse train is received a source initiation circuit is closed thereby causing seismic waves to be generated, the specific improvement comprising:
   a. changing said source initiation pulse train at predetermined time intervals in accordance with a predetermined source control program for the purpose of providing time varying control of seismic sources which use elongated input signals;
   b. repeating said source initiation pulse train transmitting and decoding steps for the purpose of executing seismic source control functions in response to said predetermined source control program; and stopping said source initiation pulse train after a predetermined elongated signal duration time has elapsed.

3. In an improved method of seismic prospecting in which seismic waves are generated by a seismic source at or near the surface of the earth, said seismic waves being detected by a seismic spread consisting of a plurality of seismometer groups positioned at separated locations along the surface of the earth each said group being formed from a plurality of adjacent individual seismometers spaced in a pattern on the surface of the earth, each of said individual seismometers producing an electrical signal corresponding to the ground motion at its surface location, said individual seismometer electrical signals being combined at group interconnection points to form a plurality of group electrical signals, separately amplifying and reproducibly recording each of said group electrical signals, including the step of: producing at a control location a plurality of group address code blocks each having a unique binary code corresponding to one of a plurality of group decoder units; arranging said group address code blocks in a sequence to form a coded pulse train; transmitting before said seismic source is initiated said coded pulse train from said control location to said plurality of group decoder units; and decoding said group address code blocks within said group interconnection points such tant when an individual group decoder receives its corresponding unique binary code a group activation circuit is energized, electrically connecting said group to an amplifying and recording apparatus thereby causing that group to become part of said seismic spread, and further including the steps of: producing at said control location a source initiation pulse train having a unique source code corresponding to a source decoder unit; transmitting said source initiation pulse train from said control location to said decoder unit located at said seismic source position following said coded puls. train transmitting step; and decoding said source initiation pulse train with said source decoder unit such that when said unique source initiation pulse train is received a source initiation circuit is closed thereby causing seismic waves to be generated, the specific improvement comprising:
   a. producing at said control location a plurality of time varying group function code blocks for the purpose of controlling at at least one auxiliary function circuit within said group decoder units located at said group interconnection points;

b. adding said group function code blocks to said group address code blocks to form said coded pulse train such that each of said group address code blocks is followed by its corresponding group function code block;

c. transmitting said coded pulse train from said control location to said group intersection point after said transmission of said source initiation pulse train;

d. decoding said group address and group function code blocks at each of said group interconnection points such that auxiliary group function circuits are activated within each of said group decoders when said group function code blocks are received;

e. repeating steps (a) through (d) above at predetermined time intervals following said transmission of said source initiation pulse train for the purpose of providing time variable group activation and function control during the period seismic waves are being recorded; and f. stopping said coded pulse trains after a predetermined total recording time interval has elapsed, said total recording time interval being at least as long as the time required for seismic waves to travel from said source position to the deepest acoustical interface of interest and back to said seismometer positioned farthest from said source.

4. A seismic prospecting method as recited in claim 3 further comprising:

a. producing at said control location a plurality of individual seismometer code blocks each having a unique binary address code segment corresponding to an individual seismometer decoder unit located at each of said individual seismometer positions;

b. forming said group address code blocks, said group function code blocks into said individual seisometer code blocks into said decoded pulse trains such that each group address code block being followed by said group function code block is then followed by said plurality of individual seismometer code blocks corresponding to said individual seismometers located within that group;

c. transmitting said pulse train from said control location through said activated group decoder units to said individual seismometer decoder units;

d. decoding said unique binary address code segments of said individual seismometer code blocks within each of said individual seismometer decoder units such that individual seismometer activations circuits are closed upon receipt of such unique binary address code segments corresponding to that individual seismometer; and e. repeating steps (a) through (d) at said predetermined time intervals corresponding to said train pulse tran repetition rate for the purpose of activating and deactivating predetermined individual seismometers within each group during said total recording time interval.

5. A seismic prospecting method as recited in claim 4 further compising:

a. producing at said control location a plurality of time varying individual seismometer function code segments for the purpose of controlling as a function of time at least one auxiliary function circuit within each of said individual seismometer decoder units;

b. combining said individual seismometer function code segments with said individual seismometer address code segments to form said seismometer code blocks;

c. decoding said unique binary seismometer function code segments of said seismometer code blocks in said individual seismometer decoding units located adjacent to said individual seismometers such that auxiliary individual seismometer function circuits are activated upon receipt of said seismometer function code segments; and d. repeating steps (a) through (c) above at said predetermined coded pulse train repetition rate for the purpose of providing time varying seismometer control function during said total recording time interval.

6. In an improved seismic prospecting system of the type having a seismic wave source on or near the surface of the earth, a plurality of seismometers positioned along the surface of the earth for detecting said seismic waves after reflection from subsurface acoustical interfaces, each of said seismometers producing an electrical signal corresponding to the seismic wave motion at its particular position, means for combining said electrical signals from adjacent seismometers at group intersection points for the purpose of producing a plurality of group electrical signals, a plurality of amplifiers and reproducible recorders for separately amplifying and recording each of said group electrical signals, an electrical signal transmission means connecting said seismometers and said amplifiers and reproducible recorders, including means for producing at a control location a coded pulse train having a program sequence of binary signals for the purpose of producing predetermined control functions at said seismic wave source, said group intersection points and said seismometer locations; means for decoding said coded pulse train at said source, group and seismometer positions for the purpose of executing said predetermined control functions; and means for control signal transmission connecting said coded pulse train producing means and said decoding means for the purpose of transmitting said coded pulse trains from said control location to said source, group and seismometer positions, the specific improvement comprising:

a. means for changing said program sequence of binary signals at predetermined time intervals during the period seismic waves are being detected by said seismometers for the purpose of producing time variable control functions at source group and seismometers positions; and b. means for repeating said coded pulse trains at said predetermined time intervals from the time said seismic wave source initiates seismic waves until the time has elapsed for seismic waves to travel from said seismic wave source to the deepest acoustical interface of interest and back to said seismometer farthest distance from said seismic wave source.

* * * * *

UNITED STATES PATENT OFFICE
CERTIFICATE OF CORRECTION

PATENT NO. : 3,916,371

DATED : October 28, 1975

INVENTOR(S) : Robert A. Broding

It is certified that error appears in the above-identified patent and that said Letters Patent are hereby corrected as shown below:

Column 8, line 39, "spearate" should read --separate--; line 40,"separate" should read --dedicated--.
Column 10, line 66, "in" should read --is--; line 66 "mes-8" should read --MCS-8--.
Column 12, line 25, "one" should read --once--; line 34, "only; a" should read --only; third, a--; line 49, "19" should read --9--.
Column 13, line 12, "(laddress-" should read --(1) address- --; line 43 "dicimal" should read --decimal--.
Column 14, line 15, "sucessive" should read --successive--.
Column 15, line 22, "A 6." should read --counter 6. --; line 58 to line 59, "refection" should read --reflection--.
Column 16, line 3, "N-2" should read --N=2" --; line 55, after "amplifier" insert --11 could be a simple amplifier--.
Column 17, line 46, after "record" insert --pulse is received from end of record--.
Claim 2, column 19, line 62, "receive" should read --receives--; "it" should read --its--.
Claim 2, column 20, line 20 before "stopping" insert --c.--.
Claim 3, column 20, line 46, after "group" insert --decoder units located at said group--; line 47,"tant" should rea --that--; line 59, "with" should read --within--.
      column 21, line 9, "point" should read --points--;
Claim 4, column 21 line 38 "into" should read --and--; line 56, after "said" insert --coded pulse--; line 57, delete "pulse tran";.
Claim 5, column 21, line 62, "compising" should read --comprising--.
Claim 6, column 22, line 54, after "at" insert --said--; line 55, "seismometers" should read --seismometer--.

*Signed and Sealed this*

*twenty-third* Day *of* *March 1976*

[SEAL]

Attest:

RUTH C. MASON
*Attesting Officer*

C. MARSHALL DANN
*Commissioner of Patents and Trademarks*